(12) United States Patent
Kachouh

(10) Patent No.: US 7,311,330 B2
(45) Date of Patent: Dec. 25, 2007

(54) HOLDING DEVICE FOR A MOTOR VEHICLE SAFETY MEANS

(75) Inventor: Checrallah Kachouh, Dortmund (DE)

(73) Assignee: Brose Schliesssysteme GmbH & Co., KG, Wuppertal (DE)

( * ) Notice: Subject to any disclaimer, the term of this patent is extended or adjusted under 35 U.S.C. 154(b) by 306 days.

(21) Appl. No.: 11/008,563

(22) Filed: Dec. 10, 2004

(65) Prior Publication Data

US 2005/0146146 A1 Jul. 7, 2005

(51) Int. Cl.
*B60R 21/13* (2006.01)

(52) U.S. Cl. .................. 280/756; 296/190.03

(58) Field of Classification Search ........... 280/748, 280/751, 756; 296/68.1, 65.01, 65.18, 107.03, 296/190.03; 297/216.12, 394
See application file for complete search history.

(56) References Cited

U.S. PATENT DOCUMENTS

| | | | | |
|---|---|---|---|---|
| 3,397,911 A * | 8/1968 | Brosius, Sr. | ........... | 297/216.12 |
| 3,715,130 A * | 2/1973 | Harada et al. | ............... | 280/738 |
| 3,885,810 A * | 5/1975 | Chika | ......................... | 280/748 |
| 5,056,816 A * | 10/1991 | Lutze et al. | ................. | 280/751 |
| 5,110,185 A * | 5/1992 | Schmutz et al. | ............. | 297/410 |
| 5,205,585 A * | 4/1993 | Reuber et al. | .............. | 280/753 |
| 5,458,396 A * | 10/1995 | Rost | ...................... | 297/216.12 |
| 5,655,791 A * | 8/1997 | Nowack et al. | .............. | 280/756 |
| 5,927,803 A * | 7/1999 | Hehl et al. | ............. | 297/216.12 |
| 6,511,095 B1 * | 1/2003 | Kober et al. | ................. | 280/756 |
| 2003/0178833 A1 * | 9/2003 | Muller | ........................ | 280/756 |
| 2003/0205891 A1 * | 11/2003 | Nass | ........................... | 280/756 |
| 2005/0082808 A1 * | 4/2005 | Wildig et al. | ............... | 280/756 |
| 2005/0161967 A1 * | 7/2005 | Rashidy et al. | ........... | 296/65.01 |
| 2005/0280253 A1 * | 12/2005 | Queveau et al. | ............ | 280/756 |
| 2006/0001248 A1 * | 1/2006 | Queveau et al. | ............ | 280/756 |
| 2006/0097499 A1 * | 5/2006 | Welch | .......................... | 280/756 |
| 2006/0131862 A1 * | 6/2006 | Hermann et al. | ............ | 280/756 |
| 2006/0267384 A1 * | 11/2006 | Fischer et al. | .......... | 297/216.12 |

FOREIGN PATENT DOCUMENTS

| | | |
|---|---|---|
| DE | 198 21 549 A1 | 5/1999 |
| DE | 100 38 431 A1 | 2/2002 |
| DE | 102 36 282 A1 | 3/2003 |

* cited by examiner

*Primary Examiner*—Paul N. Dickson
*Assistant Examiner*—Barry Gooden, Jr.
(74) *Attorney, Agent, or Firm*—David S. Safran

(57) ABSTRACT

A motor vehicle safety mechanism has a component which can be displaced out of a rest position suddenly into an action position by release of a holding device. Such a motor vehicle safety mechanism is, for example, a head support/roll bar which extends automatically in an accident. The holding device has a latch which fixes the component in the rest position and a ratchet arrangement which holds the latch in the action or engagement position. The ratchet arrangement has ratchet kinematics and an adjustable blocking element. By moving the latch out of the engagement position into the direction of the release position, the ratchet kinematics are moved and the blocking element blocks the movement of the ratchet kinematics.

20 Claims, 5 Drawing Sheets

HOLDING DEVICE FOR A MOTOR VEHICLE SAFETY MEANS

BACKGROUND OF THE INVENTION

1. Field of Invention

The invention relates to a holding device for a motor vehicle safety means and, more specifically, to a holding device which can be displaced out of a rest position and into an action position.

2. Description of Related Art

Motor vehicle safety means in various versions are known from practice. Such a motor vehicle safety means is used to prevent or limit injury to passengers in case of an accident. Motor vehicle safety means of the type under consideration can include roll bars, movable head supports, knee cushions, displaceable hoods, or the like. In an accident, the motor vehicle safety means is mechanically displaced into a protective position. For this purpose, a corresponding component of the motor vehicle safety means is suddenly displaced out of a rest position into an action position. As a rule, the energy required for this function is made provided by spring elements (e.g., mechanical or pneumatic spring elements).

In normal operation of a motor vehicle, the component which is to be displaced, that is, the component of the motor vehicle safety means, is fixed in its rest position by a holding device where the associated holding forces applied are comparatively high. For operation of the motor vehicle safety means in an accident, reaction time for triggering of the motor vehicle safety should be as short as possible. Whether at any time during the use of a motor vehicle such a case occurs, is however uncertain. It is therefore necessary for the motor vehicle safety means to reliably trigger even after several years of inactivity. Of course, triggering of the motor vehicle safety means should not take place in normal daily operation of the motor vehicle, not even when steering and transverse accelerations, which are typical of operation, occur.

The aforementioned explanations make it clear that contradictory requirements are imposed on a holding device for a motor vehicle safety means. Accordingly, different approaches to construction of these holding devices are known. The known holding device for the motor vehicle safety means which underlies the invention is provided in German Patent Application DE 198 21 594 A1 and which shows a ratchet arrangement for a latch with two ratchets which are arranged to act in succession. The second ratchet represents a blocking element which can be moved by a motorized drive, in this case, by an electromagnet.

In the above described prior art device, the latch, on the one hand, and the two ratchets, on the other, are each arranged at a right angle to one another. The arrangement results in that a force which is triggered, for example, by vibrations, can act only on one of the three parts in the sense of opening.

The high holding forces which hold the holding device in the rest position of the component in case of an accident situation should not lead to an overly long reaction time. Therefore, in the known holding device, the ratchet arrangement with a ratchet kinematics is made as a reducing gear, specifically as a lever gear. The electromagnet acts on the long lever arm of the second ratchet.

SUMMARY OF THE INVENTION

An object of this invention is to embody and develop a holding device with consideration of the special aspects of such a motor vehicle safety means. The holding device needs to also consider the forces and force action directions which arise, in normal operation and in an accident, so that, with high operating safety, the force and/or work which is/are to be applied for the release of the ratchet is/are minimized.

Objects of the present invention are achieved in a holding device for a motor vehicle safety means with a component which can be displaced out of a rest position suddenly into an action position. The holding device includes a holding element and a latch which fixes the component in the rest position. The latch acts on the holding element of the component, wherein the latch can pivot around a pivot axle, and thus, can be moved into an engagement position which holds the component, and into a release position which releases the holding element and thus the safety component. The holding device also includes a ratchet arrangement which holds the latch in the engagement position. The ratchet arrangement can be moved into a holding position which holds the latch in the engagement position, and into a release position which releases the latch. The ratchet arrangement further includes ratchet kinematics, and an adjustable blocking element. When the ratchet arrangement is in the holding position, the blocking element prevents movement of the latch out of the engagement position into the release position, and by moving the latch out of the engagement position in the direction of the release position, the ratchet kinematics is moved and the adjustable blocking element blocks the movement of the ratchet kinematics caused by the latch.

In accordance with the present invention, the latch itself is an active component of the holding device. By moving the latch out of the engagement position in the direction of the release position the ratchet kinematics of the ratchet arrangement is actively moved. The blocking of the latch by the blocking element takes place indirectly. The blocking element blocks the movement of the ratchet kinematics, which movement can be caused by the latch itself.

The term "ratchet kinematics" as used in this application is defined comprehensively as a mechanism which is connected between the latch and the blocking element. For the starting point of the teaching, it is itself again only a ratchet-like component; but, this is not absolutely essential. In a corresponding design of the ratchet kinematics, the force which is necessary for release of the latch and thus for triggering of the motor vehicle safety means can be reduced. This is of interest because, in this way, the necessarily high retention force against the action of the spring element on the displaceable component arises only greatly reduced on the blocking element. In this respect, only small friction forces occur. This ensures a short reaction time for the motor vehicle safety means.

Conventionally, a motor vehicle safety means will be equipped with a motorized opening drive, for example, an electric motor, electromagnet or pneumatic drive. It is advantageous that this opening drive need have only low power, and the desired short opening times result.

In accordance with another embodiment of the invention, the latch with the intermediate lever and the transmission lever forms a four-bar linkage, with which largely any speed reduction ratios can be set with low construction cost. With this simple adjustability of speed reduction, the ratchet arrangement can be optimally adapted to the respective application.

The pivot coupling of the intermediate lever to the latch eliminates the necessity of direct blocking engagement between the ratchet arrangement and the latch. At the high retention forces of a motor vehicle safety means, this construction is of considerable advantage.

It should be pointed out that in all embodiments, a weight reduction is possible, in that either lighter plastic materials can be used, or certain components can be designed to be less "solid" or that smaller drives can be used.

The invention is explained in detail below with reference to the accompanying drawings.

DETAILED DESCRIPTION OF INVENTION

Figure 1:
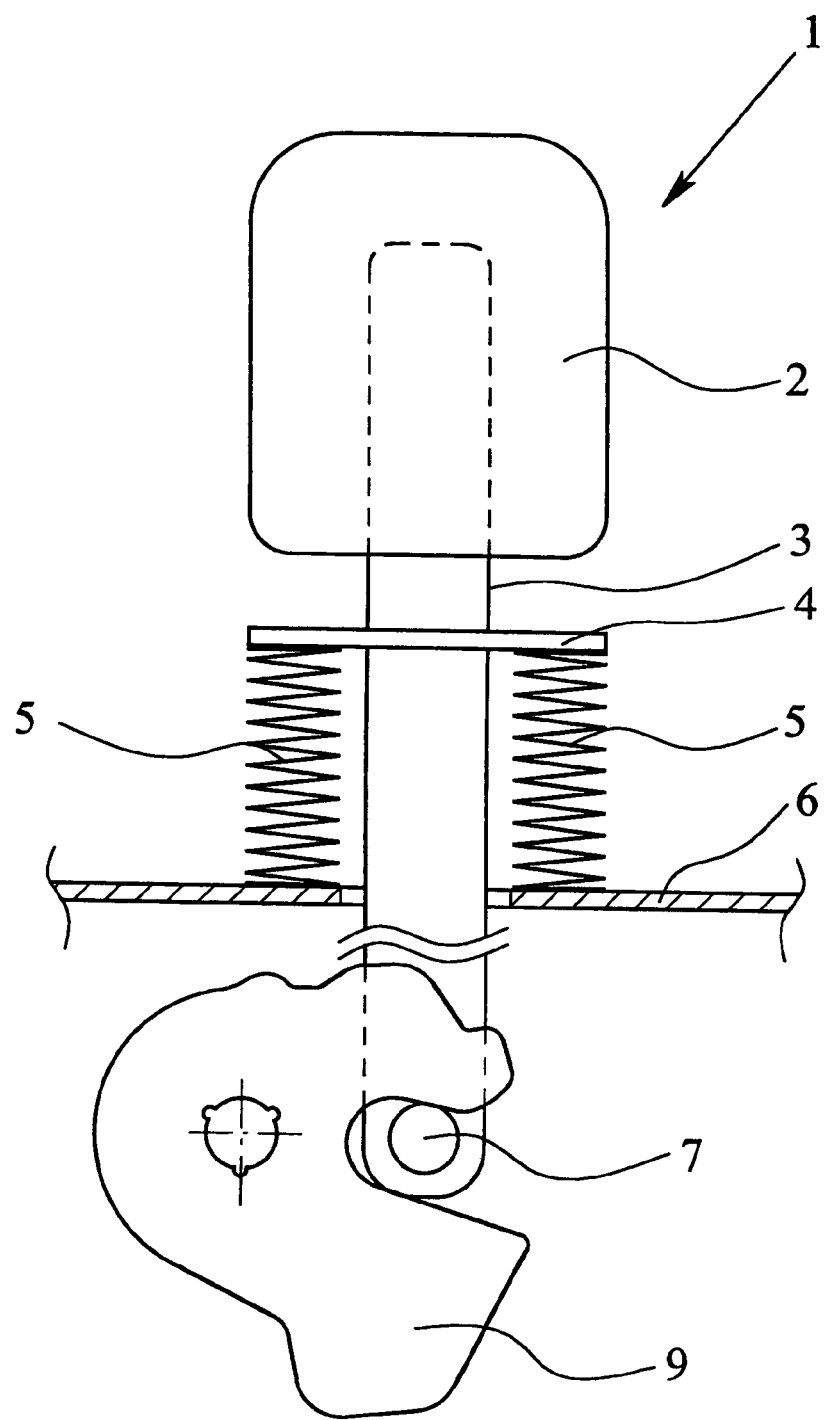
FIG. 1 schematically shows a motor vehicle safety means in the form of a retractable head support with an integrated roll bar and holding device.

FIG. 1 shows, as an example of a motor vehicle safety means 1, a head support with an integrated roll bar which is illustrated in broken line. The head support and roll bar form a safety component 2 which can be suddenly moved out of a rest position, shown in FIG. 1, into an action position which is raised relative to the position shown.

The component 2 of the motor vehicle safety means 1 has a carrier 3. On this carrier 3, there is, in this embodiment, a flange 4 on which spring assemblies 5 act for sudden displacement of the component 2 into its action position, here into an extended position. In the rest position of the component 2, these spring assemblies 5 are clamped between the flange 4 and a body-mounted abutment 6. The component 2 retains its rest position because it is fixed in this rest position by a holding device. To do this, the component 2 has a holding element 7 which lies in a body-mounted inlet channel 8 (shown in broken lines in FIG. 2) in the rest position of the component 2 and is fixed there by the latch 9 of the holding device.

Figure 2:
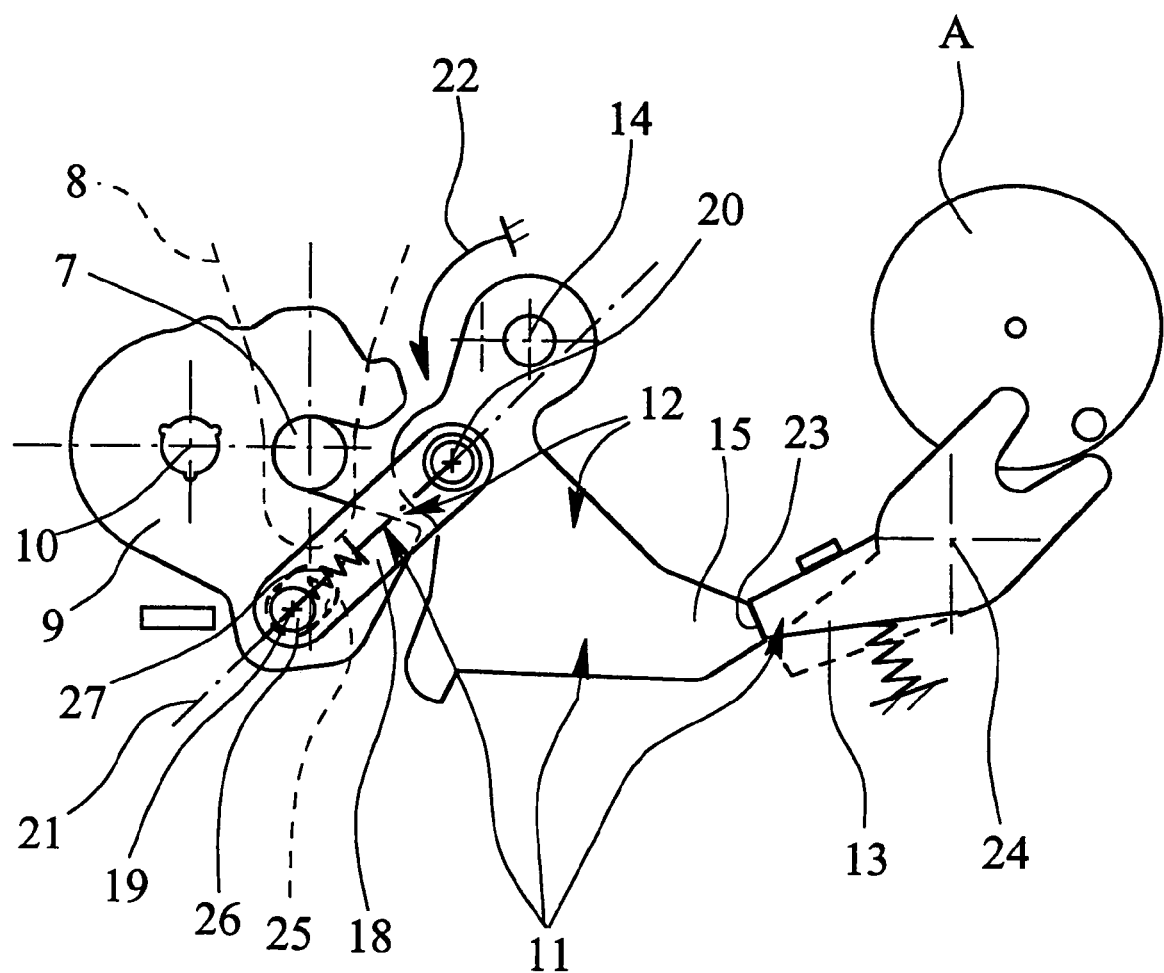
FIG. 2 shows a holding device with a latch and a ratchet arrangement in the engagement position.

FIG. 2 shows a preferred embodiment of such a holding device. The holding device, first of all, has a latch 9 which fixes the component 2 in the rest position and which acts on the holding element 7 of the component 2 (illustrated for example in FIG. 1). The latch 9 can be swung around a swiveling axle 10. This swiveling axle 10 is body-mounted. The swiveling makes it possible to move the latch 9, on the one hand, into the engagement position which holds the component 2, shown in FIG. 2, and on the other hand, into the release position which releases the holding element 7 and thus the component 2, shown in FIG. 3 of the drawings.

Furthermore, there is a ratchet arrangement 11 which holds the latch 9 in the engagement position. The ratchet arrangement 11 which, for its part, can be moved into a holding position which holds the latch 9 in the engagement position and, on the other hand, into a release position which releases the latch 9. To do this, the ratchet arrangement 11 has ratchet kinematics 12 and a displaceable blocking element 13. When the ratchet arrangement 11 is in the holding position, the blocking element 13 prevents movement of the latch 9 out of the engagement position (illustrated in FIG. 2) into the release position (illustrated in FIG. 3). The position which is shown in FIG. 2 is the rest position of the component 2 and the position which is maintained by the holding device and the motor vehicle safety means 1 during the entire interval of use of the motor vehicle. Regardless of this, in an accident, reliable triggering of the component 2 must take place in the shortest time possible.

By moving the latch 9 out of the engagement position in the direction of the release position, the ratchet kinematics 12 is actively moved. The blocking action of the blocking element 13 is therefore implemented, in that the movement of the ratchet kinematics 12, which can be caused by the latch 9, is blocked.

In the illustrated embodiment, the ratchet kinematics 12 is made as a reducing gear so that the blocking force applied by the blocking element 13 for blocking of the latch 9 is reduced according to the design of the reducing gear. The term "reducing gear" here means that the amount of reset force which acts on the ratchet kinematics 12 from the latch 9 is greater than the resulting force acting from the ratchet kinematics 12 on the blocking element 13.

As explained in the Background section, the configuration of the holding device with a motorized opening drive, in conjunction with the described ratchet arrangement 11, is especially advantageous. The release of the latch 9 can be triggered, in that the opening drive A, represented in FIG. 2, causes movement of the blocking element 13 from the blocking position (solid line position in FIG. 2) into the nonblocking position (dash line position in FIG. 2). The opening drive 2 is made as an electric motorized worm wheel drive. The corresponding constructions are extensively known in the prior art, for example, from German Patent Application DE 100 38 431 A1. German Patent DE 198 21 594 C2 conversely shows an electromagnet as the opening drive.

In the illustrated embodiment which is preferred in this respect, the ratchet kinematics 12 has a transmission lever 15 which can be pivoted around a pivot axle 14. By resetting the latch 9 out of the engagement position in the direction of the release position (around to the left in FIG. 2), the transmission lever 15, in FIG. 2, can be moved around to the left. When the ratchet arrangement 11 is in the holding position, the blocking element 13 blocks the transmission lever 15 so that, as a result, the resetting of the latch 9 is blocked.

Figure 5:
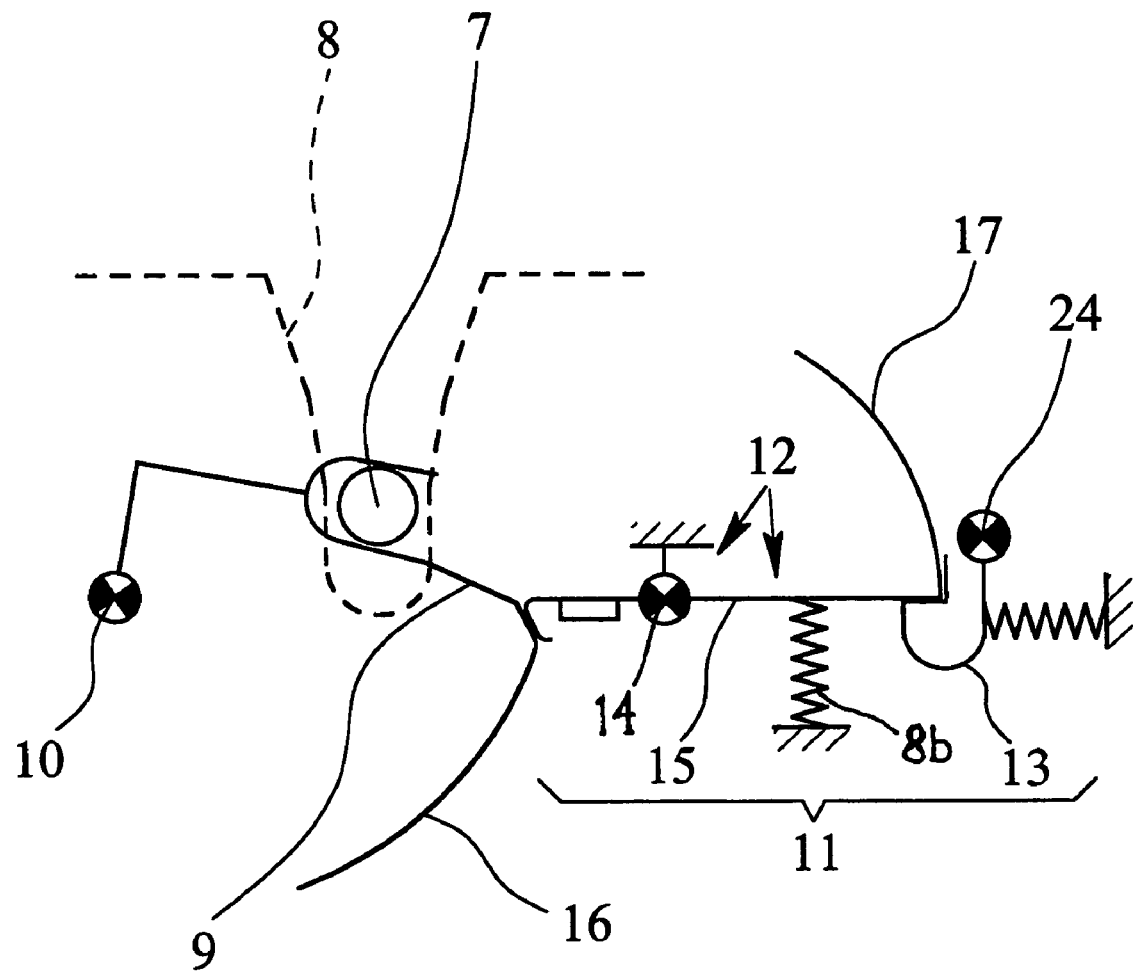

One exemplary embodiment of the aforementioned principle which can be implemented with few components is shown schematically in FIG. 5. The transmission lever 15 can be caused to engage the blocking element 13, on one hand, and the latch 9 on the other. FIG. 5 shows the latch 9 in the engagement position and the ratchet arrangement 11 in the holding position.

If, at this point, the blocking element 13 is swung to the right in FIG. 5, the latch 9 is released. The resetting of the latch 9 out of the engagement position shown in FIG. 5, around to the left, causes pivoting of the transmission lever 15 (in FIG. 5) around to the right against the pretensioning of a spring 8b. The guide surface 16, which is located on the latch 9, keeps the transmission lever 15 in the deflected position. A further guide surface 17, likewise, keeps the blocking element 13 in the deflected position. As the latch 9 subsequently moves out of the release position into the engagement position, the blocking element 13 again engages the transmission lever 15 by blocking, and thus keeps the latch 9 in the illustrated engagement position. It is especially advantageous that the transmission lever 15, which is part of the ratchet kinematics 12, is made as reducing gear since the pivot axle 14 of the transmission lever 15 is not located in the middle, but offset on the transmission lever 15.

It should be pointed out that blocking of the transmission lever 15 by the blocking element 13 is provided preferably in only one swivel direction of the transmission lever 15. In certain applications, it can, however, be advantageous when blocking by the blocking element 13 prevents swiveling of the transmission lever 15 in the two directions of swiveling.

Figure 3:
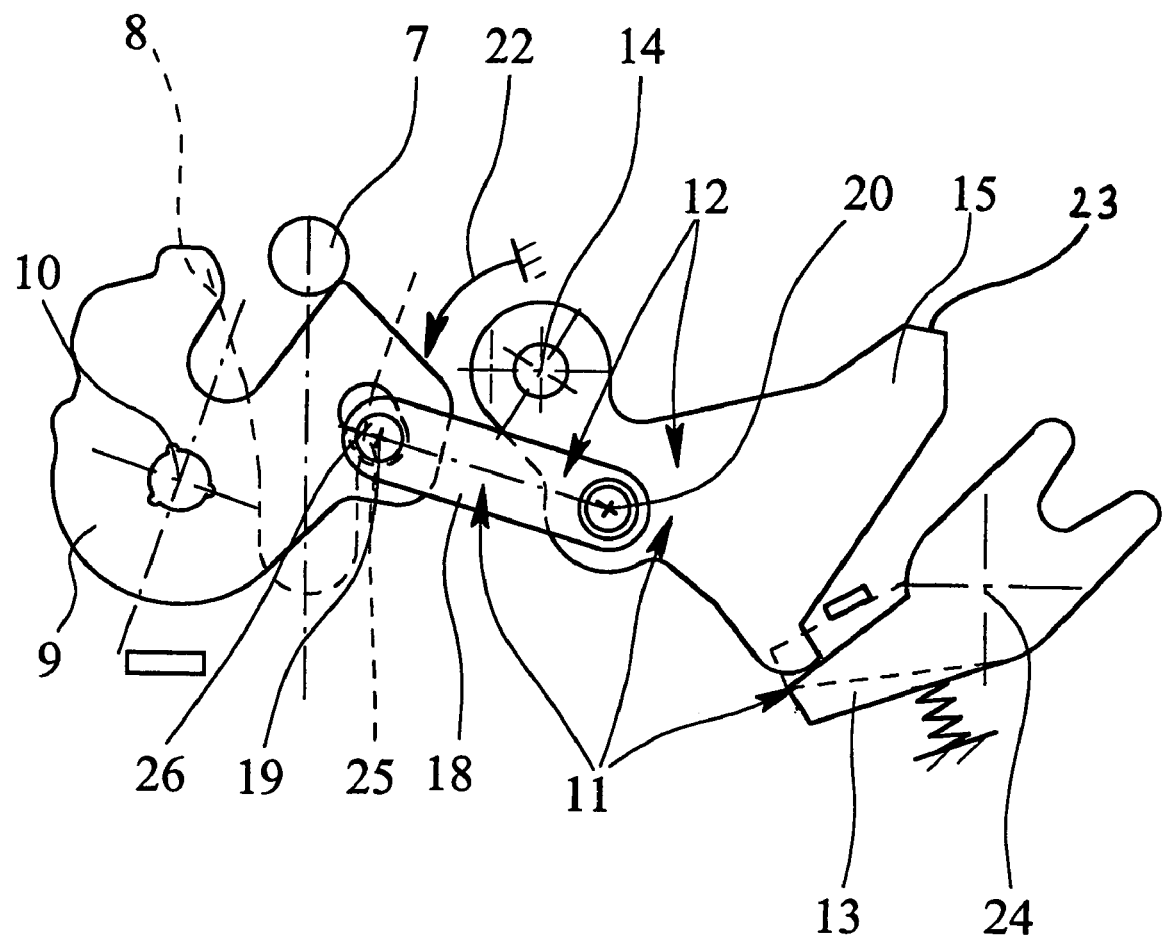
FIG. 3 shows the holding device of FIG. 2 in the release position.
Figure 4:
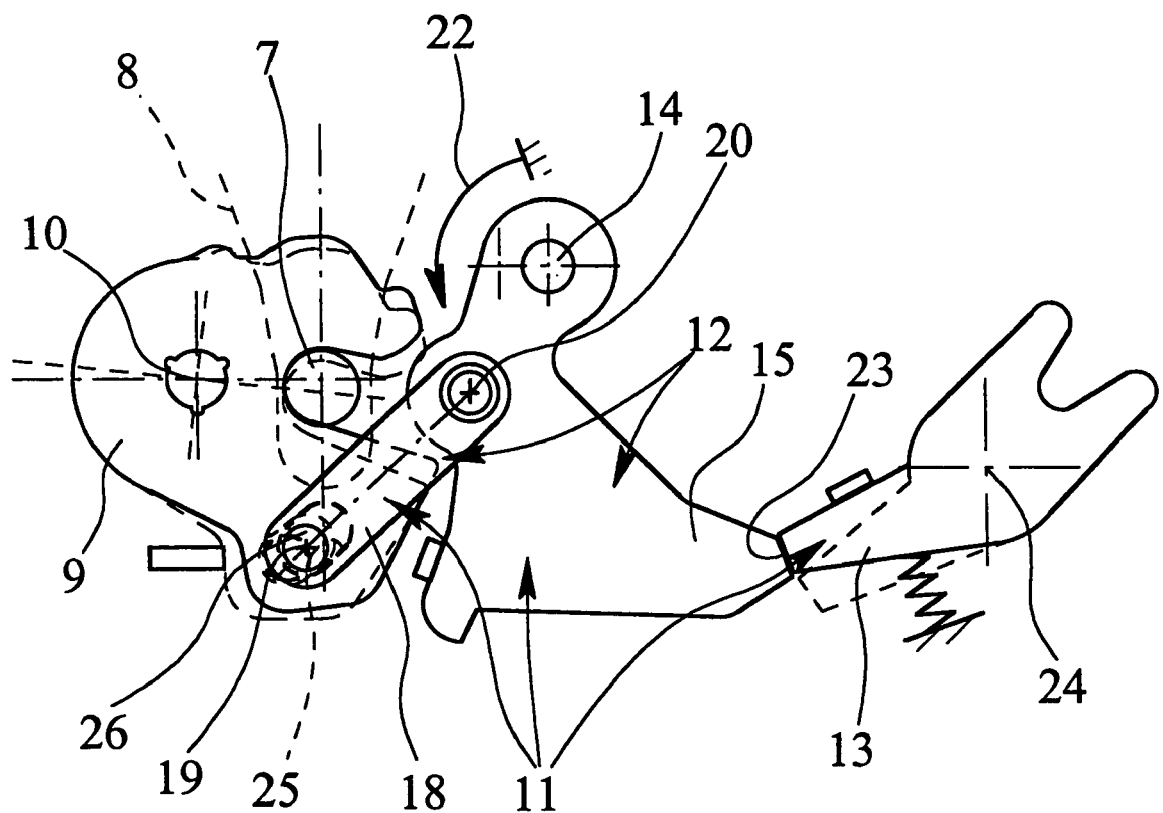
FIG. 4 shows the holding device of FIG. 2 in the over-travel position (broken line) and FIG. 5 schematically shows another holding device with a latch and ratchet arrangement.

In the embodiment shown in FIGS. 2 to 4, the transmission lever 15 is dynamically coupled to the latch 9. This means forced coupling between the transmission lever 15 and the latch 9 which leads to the fact that movement of the latch 9 leads fundamentally to a corresponding movement of the transmission lever 15.

In the preferred configuration for the aforementioned dynamic coupling, an intermediate lever 18 is situated between the transmission lever 15 and the latch 9, and it is coupled to be able to swivel to the latch 9, on the one hand, and to the transmission lever 15, on the other. The coupling point 19 on the latch 9, with respect to the swiveling axle 10 of the latch 9, is located off-center, therefore spaced away from the swiveling axle 10. Accordingly the coupling point 20, is located off-center on the transmission lever 15 with respect to the pivot axle 14 of the transmission lever 15.

The above-described coupling between the latch 9, the intermediate lever 18 and the transmission lever 15 yields a four-bar mechanism by which the speed reduction of the ratchet kinematics 12, which is desired at the time, can be set with little structural effort. It is especially advantageous that the speed reduction of such a four-bar mechanism changes depending on the position, for example, of the transmission lever 15.

It is especially advantageous for the operating reliability of the holding device if, when the latch 9 is in the engagement position, the force which acts from the latch 9 via the intermediate lever 18 on the transmission lever 15 causes a torque on the transmission lever 15 with respect to its pivot axle 14 and if the blocking force of the blocking element 13 opposes this torque.

From FIG. 2, it is apparent that, when a force is acting from the holding element 7 of the component 2 in FIG. 2 upward (caused by the spring assemblies 5), a corresponding force is directed from the latch 9 via the intermediate lever 18 to the transmission lever 15. The line of action 21 of this force runs through the two coupling points 19, 20. Because the line of action 21 of the force in FIG. 2 runs to the right, past the pivot axle 14 of the transmission lever 15, a torque is produced on the transmission lever 15 in FIG. 2 around to the left. The blocking force of the blocking element 13 opposes this torque. The speed reduction becomes greater, the nearer the line of action 21 of the force runs on the pivot axle 14. By means of suitable spacing the aforementioned objectives of the present invention can be achieved optimally.

The spring assemblies 5 on the component 2 ensure that the latch 9 normally reliably reaches the release position. In spite of this, for the transmission lever 15 pretensioning is established which counteracts the blocking force of the blocking element 13. This pretensioning can also be provided on other components of the ratchet kinematics 12. The direction of the pretensioning on the transmission lever 15 is shown by arrow 22.

A catch 23 on the transmission lever 15 is employed to transmit the aforementioned blocking force from the blocking element 13 to the transmission element 15.

The blocking element 13 can be pivoted around a pivot axis 24. Furthermore, there is a stop against which the blocking element 13 rests in the blocking position and against which the pretensioning of the spring, which engages the blocking element 13, acts. When the ratchet arrangement 11 is in the holding position, the blocking element 13, as described above, engages the transmission lever 15 by blocking. This configuration of the blocking element 13 in the manner of a ratchet leads to a structurally sound and efficient implementation.

In another exemplary configuration, the coupling of the intermediate lever 18 to the latch 9 has a free-wheel. In this way, it is possible that movement of the latch 9 out of the engagement position into the overtravel position which, viewed from the release position, is located on the other side of the engagement position, is possible without necessarily entailing movement of the transmission lever 15. The overtravel position of the latch 9 is shown by the broken line in FIG. 4. The overtravel position of latch 9 is briefly assumed when the component 2, after prior triggering, is returned again (for example, in the case of an accident) into its rest position. The transmission lever 15 during this is pressed against the stop into its overtravel position so that the blocking element 13 can engage the blocking position.

The aforementioned free-wheel (lost motion) is implemented in that the latch 9 has an elongated hole 25 and the intermediate lever 18 has a journal 26 which is located in the elongated hole 25. When the latch 9 is moved from the main closed position into the overtravel position, the journal 26 runs in the elongated hole 25, as is shown in FIG. 4.

In order to ensure adequate coupling between the latch 9 and the ratchet kinematics 12, or for resetting the latch 9 out of the engagement position into the release position, or the above described fixing of the transmission lever 15 on the stop for the overtravel of the latch 9, or furthermore to avoid uncontrolled running of the journal 26 in the elongated hole 25, the intermediate lever 18 is pretensioned against the latch 9 such that the latch 9 can be moved into the overtravel position only against the pretensioning. This pretensioning can be implemented by a pretensioning spring 27, as is shown in FIG. 2.

Thus, it is possible to pretension the latch 9 by means of another spring in the direction of its release position. Then the latch 9 maintains this release position until the holding element 7 has been guided again into the rest position and the latch 9 has thus again reached the engagement position in which it is fixed by the ratchet arrangement 11. For this embodiment, with the special conditions of a vehicle safety means 1 it can however be more feasible for the latch 9 to be spring-pretensioned in the direction of the engagement position.

What is claimed is:

1. A holding device for a motor vehicle safety means with a component which can be displaced out of a rest position suddenly into an action position, comprising:
   a holding element;
   a latch which fixes the component in the rest position and which acts on the holding element of the component, wherein the latch is pivotable around a pivot axis and is thereby movable into an engagement position which holds the component, and into a release position which releases the holding element and thus the component;
   a ratchet arrangement which holds the latch in the engagement position, wherein the ratchet arrangement is movable into a holding position which holds the latch in the engagement position, and into a release position which releases the latch, the ratchet arrangement further comprising:
   ratchet kinematics, and
   a displaceable blocking element, wherein, when the ratchet arrangement is in the holding position, the blocking element prevents movement of the latch from the engagement position into the release position, and by moving the latch in the direction of the release position, the ratchet kinematics is moved and the displaceable blocking element blocks the movement of the ratchet kinematics caused by the latch.

2. The motor vehicle lock of claim 1, wherein the ratchet the blocking force applied to the latch by the blocking element is reduced.

3. The holding device of claim 1, the holding device further comprising:
a motorized opening drive associated with the blocking element so that the latch is released by motor.

4. The holding device of claim 1, wherein the ratchet kinematics further comprises:
a transmission lever which is pivotable around a pivot axis, wherein by pivoting the latch in the direction of the release position, the transmission lever can be moved, and wherein, when the ratchet arrangement is in the holding position, the blocking element blocks the transmission lever.

5. The holding device of claim 4, wherein the transmission lever is coupled to the latch.

6. The holding device of claim 5, further comprising:
an intermediate lever located between the transmission lever and the latch to couple the latch and transmission lever, wherein the intermediate lever is able to pivot relative to the latch and relative to the transmission lever.

7. The holding device of claim 6, wherein, when the latch is in the engagement position, the force which acts from the latch via the intermediate lever on the transmission lever causes a torque on the transmission lever with respect to its pivot axis, and wherein the blocking force of the blocking element opposes this torque.

8. The holding device of claim 2, wherein the ratchet kinematics further comprises:
a transmission lever which is pivotable around a pivot axis, wherein by pivoting the latch from the engagement position in the direction of the release position, the transmission lever can be moved, and wherein, when the ratchet arrangement is in the holding position, the blocking element blocks the transmission lever.

9. The holding device of claim 8, wherein the transmission lever is coupled to the latch.

10. The holding device of claim 9, further comprising:
an intermediate lever located between the transmission lever and the latch to couple the latch and transmission lever, wherein the intermediate lever is able to pivot relative to the latch and relative to the transmission lever.

11. The holding device of claim 10, wherein, when the latch is in the engagement position, the force which acts from the latch via the intermediate lever on the transmission lever causes a torque on the transmission lever with respect to its pivot axis, and wherein the blocking force of the blocking element opposes this torque.

12. The holding device of claim 4, wherein the transmission lever is pretensioned and wherein the pretensioning of the transmission lever opposes the blocking force of the blocking element when the transmission lever is pivoted from the holding position.

13. The holding device of claim 4, wherein the transmission lever has a catch and wherein the blocking element is movable into blocking engagement with the transmission lever via the catch.

14. The holding device of claim 12, wherein the transmission lever has a catch and wherein the blocking element can be moved into blocking engagement with the transmission lever via the catch.

15. The holding device of claim 4, wherein the blocking element is pivotable around a pivot axis, and when the ratchet arrangement is in the holding position, the blocking element is in blocking engagement with the transmission lever.

16. The holding device of claim 6, wherein the coupling of the intermediate lever to the latch has a free-wheel mechanism that allows movement of the latch out of the engagement position into an overtravel position without movement of the transmission lever.

17. The holding device of claim 16, wherein the intermediate lever is pretensioned against the latch such that the latch is movable into the overtravel position against the pretensioning.

18. The holding device of claim 3, wherein the opening drive is one of an electric motor, an electromagnet or a pneumatic drive.

19. The holding device of claim 6, wherein the coupling of the intermediate lever to the transmission lever is located off-center relative to the pivot axis of the transmission lever and wherein the coupling of the intermediate lever to the latch is located off-center relative to the pivot axis of the latch.

20. The holding device of claim 10, wherein the coupling of the intermediate lever to the transmission lever is located off-center relative to the pivot axis of the transmission lever and wherein the coupling of the intermediate lever to the latch is located off-center relative to the pivot axis of the latch.

* * * * *